United States Patent
Nagai et al.

(10) Patent No.: US 12,531,317 B2
(45) Date of Patent: Jan. 20, 2026

(54) POWER STORAGE MODULE

(71) Applicant: TOYOTA JIDOSHA KABUSHIKI KAISHA, Toyota (JP)

(72) Inventors: Hiroki Nagai, Ama-gun (JP); Takaaki Matsui, Toyota (JP); Takafumi Nose, Nagoya (JP); Koichiro Isobe, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 901 days.

(21) Appl. No.: 17/747,134

(22) Filed: May 18, 2022

(65) Prior Publication Data

US 2023/0006321 A1 Jan. 5, 2023

(30) Foreign Application Priority Data

Jul. 5, 2021 (JP) .................. 2021-111313

(51) Int. Cl.
*H01M 50/593* (2021.01)
*H01M 50/291* (2021.01)
*H01M 50/588* (2021.01)

(52) U.S. Cl.
CPC ....... *H01M 50/593* (2021.01); *H01M 50/291* (2021.01); *H01M 50/588* (2021.01)

(58) Field of Classification Search
None
See application file for complete search history.

(56) References Cited

U.S. PATENT DOCUMENTS

| | | | |
|---|---|---|---|
| 2005/0287426 A1* | 12/2005 | Kim | H01M 50/291 429/120 |
| 2010/0143785 A1 | 6/2010 | Kwag et al. | |
| 2014/0205876 A1 | 7/2014 | Murata | |
| 2014/0242425 A1* | 8/2014 | Callahan | H01M 50/224 429/87 |
| 2016/0156053 A1 | 6/2016 | Horai | |
| 2022/0367936 A1 | 11/2022 | Harazuka et al. | |

FOREIGN PATENT DOCUMENTS

| | | |
|---|---|---|
| JP | 2007-134089 A | 5/2007 |
| JP | 2008-204816 A | 9/2008 |
| JP | 2010-182488 A | 8/2010 |
| JP | 2013-041708 A | 2/2013 |
| JP | 2013-054940 A | 3/2013 |
| JP | 2018-81886 A | 5/2018 |
| WO | 2015/004969 A1 | 1/2015 |
| WO | 2020/262085 A1 | 12/2020 |

* cited by examiner

*Primary Examiner* — Nathanael T Zemui
(74) *Attorney, Agent, or Firm* — Oliff PLC

(57) ABSTRACT

A power storage module includes: a first power storage cell and a second power storage cell placed to be adjacent to each other, the first power storage cell and the second power storage cell each including a housing having a top face and external terminals provided on the top face; and a spacer having an insulating property and placed between the housings adjacent to each other. The spacer includes a discharge portion via which liquid reaching the spacer from above is discharged to outside the spacer.

2 Claims, 6 Drawing Sheets

POWER STORAGE MODULE

CROSS-REFERENCE TO RELATED APPLICATION

This application claims priority to Japanese Patent Application No. 2021-111313 filed on Jul. 5, 2021, incorporated herein by reference in its entirety.

BACKGROUND

1. Technical Field

This disclosure relates to a power storage module provided in a vehicle.

2. Description of Related Art

As a power storage module in the related art, Japanese Unexamined Patent Application Publication No. 2013-041708 (JP 2013-041708 A) describes a technology in which a projecting portion projecting toward a lateral side is provided in an upper end part of a side face of a spacer placed between power storage cells adjacent to each other, and an inclined surface is formed on the top face of the projecting portion such that the inclined surface is directed downward as it is distanced from the side face of the spacer. Hereby, foreign matter falling onto the projecting portion falls along the inclined surface, so that it is possible to restrain the foreign matter from being deposited on the projecting portion.

SUMMARY

In the power storage module described in JP 2013-041708 A, since the projecting portion has the inclined surface, it is possible to restrain foreign matter such as dust from being deposited on the projecting portion. However, the top face of the spacer is formed in a flat shape. Accordingly, in a case where liquid such as dew drop water reaches the top face of the spacer, the liquid cannot be moved, so that the liquid is accumulated on the top face of the spacer. In this case, the power storage cells adjacent to each other may make a short circuit.

This disclosure is accomplished in view of the above problems, and an object of this disclosure is to provide a power storage module that can restrain a short circuit from being caused between power storage cells adjacent to each other in a case where liquid reaches between the power storage cells adjacent to each other.

A power storage module according to this disclosure includes a first power storage cell, a second power storage cell, and a spacer. The first power storage cell and the second power storage cell are placed to be adjacent to each other, and the first power storage cell and the second power storage cell each include a housing having a top face and external terminals provided on the top face. The spacer has an insulating property and is placed between the housings adjacent to each other. The spacer includes a discharge portion via which liquid reaching the spacer from above is discharged to outside the spacer.

In the above configuration, by providing the discharge portion in the spacer, it is possible to discharge liquid reaching the spacer from above to outside the spacer via the discharge portion. Hereby, it is possible to restrain a creepage distance between respective external terminals of the power storage cells adjacent to each other from decreasing due to accumulation of liquid. As a result, it is possible to secure an insulating property between the external terminals of the power storage cells adjacent to each other, thereby making it possible to restrain a short circuit from being caused between the power storage cells adjacent to each other.

In the power storage module according to this disclosure, the spacer may include a top face portion placed at a position lower than the top face of the housing. The top face portion may have an inclined surface inclined downward toward a first side in a direction perpendicular to the up-down direction and the arrangement direction where the first power storage cell and the second power storage cell are arranged. In this case, the discharge portion may be constituted by the inclined surface.

In the above configuration, the inclined surface is provided in the top face portion of the spacer. Hereby, even in a case where liquid reaches the top face portion of the spacer, it is possible to discharge liquid to outside the spacer via the inclined surface.

In the power storage module according to this disclosure, the spacer may include one or more discharge channels communicating in the up-down direction. In this case, the discharge portion may be constituted by the one or more discharge channels. When a length of the housing in the direction perpendicular to the up-down direction and the arrangement direction where the first power storage cell and the second power storage cell are arranged is expressed as A (mm), a distance between the housings adjacent to each other in the arrangement direction is expressed as B (mm), and a total passage area of the one or more discharge channels on a section of the spacer that is perpendicular to the up-down direction is expressed as C (mm$^2$), C/(A×B) may be not less than 1% but not more than 50%.

In the above configuration, C/(A×B) is set to be not less than 1% but not more than 50% as described above. Accordingly, it is possible to discharge liquid reaching the spacer from above to outside the spacer via the discharge portion. In addition, when an impact is input into the spacer from outside, it is possible to restrain the spacer from being damaged.

With this disclosure, it is possible to provide a power storage module that can restrain a short circuit from being caused between power storage cells adjacent to each other due to liquid when the liquid reaches between the power storage cells adjacent to each other.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
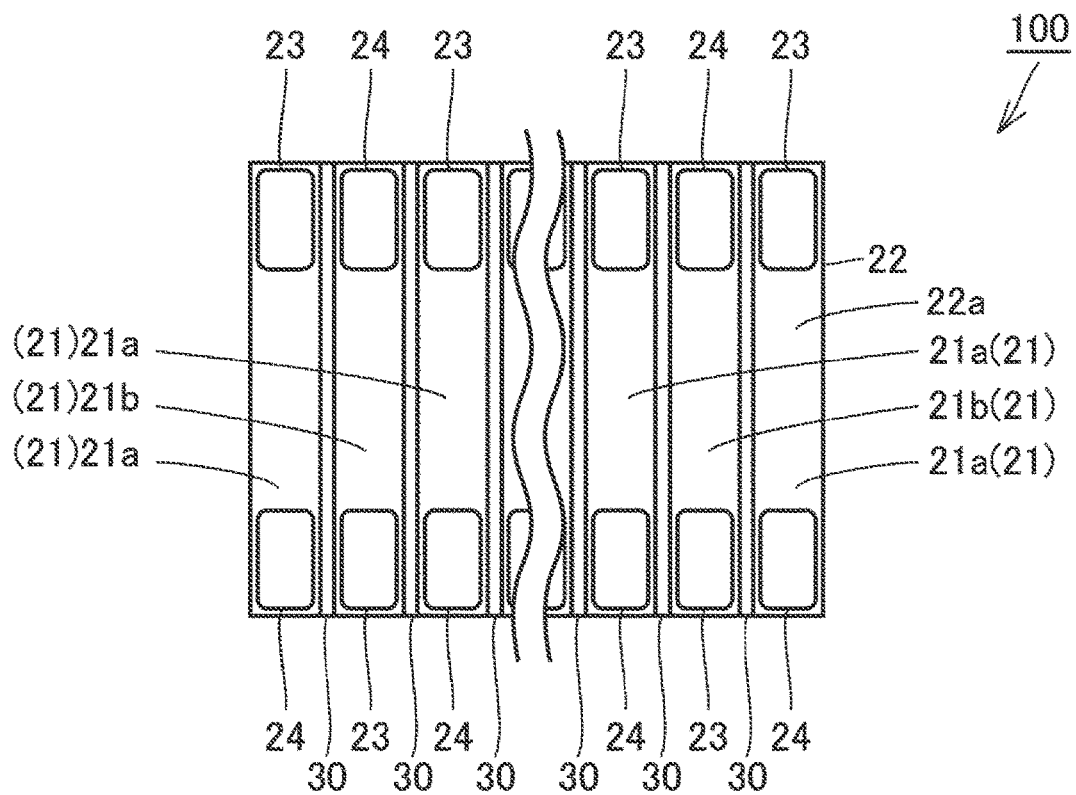
FIG. 1 is a top view of a power storage module according to Embodiment 1.

The following describes embodiments of this disclosure in detail with reference to the drawings. Note that, in the following embodiments, the same part or common parts have the same reference sign in the drawings, and redundant descriptions are omitted.

Embodiment 1

FIG. 1 is a top view of a power storage module according to Embodiment 1. With reference to FIG. 1, a power storage module 100 according to the embodiment will be described.

The power storage module 100 according to Embodiment 1 is provided in a hybrid electric vehicle travelable by use of power from at least either one of a motor and an engine or an electrified vehicle traveling by a driving force obtained by electrical energy.

The power storage module 100 includes a plurality of power storage cells 21 and a plurality of spacers 30. The power storage cells 21 and the spacers 30 are arranged alternately along a predetermined arrangement direction.

For example, the power storage cell 21 is a secondary battery such as a nickel-metal hydride battery or a lithium ion battery. A single cell has a square shape, for example. The secondary battery may use liquid electrolyte or may use solid electrolyte. Further, the power storage cell may be a unit capacitor configured such that electric power is storable.

The power storage cell 21 includes a housing 22, and a positive terminal 23 and negative terminal 24 as external terminals. A battery element (not illustrated) is accommodated inside the housing 22. The positive terminal 23 and the negative terminal 24 are provided on a top face 22a of the housing 22. The positive terminal 23 is electrically connected to a positive electrode side of the battery element. The negative terminal 24 is electrically connected to a negative electrode side of the battery element. Note that the positive terminal 23 and the negative terminal 24 are insulated from the housing 22 by an insulator (not illustrated).

The power storage cells 21 include a first power storage cell 21a and a second power storage cell 21b adjacent to each other in the arrangement direction. The first power storage cell 21a and the second power storage cell 21b are arranged such that their positive terminals 23 and their negative terminals 24 are arranged alternately in the arrangement direction.

The spacer 30 is placed between the power storage cells 21 adjacent to each other. The spacer 30 is placed between the first power storage cell 21a and the second power storage cell 21b. More specifically, the spacer 30 is placed between the housing 22 of the first power storage cell 21a and the housing 22 of the second power storage cell 21b.

The spacer 30 has an insulating property. The spacer 30 is constituted by a resin member having an insulating property. As a resin member, polypropylene (PP), polyethylene (PE), polyethylene terephthalate (PET), polystyrene (PS), polycarbonate (PC), or the like can be employed.

Figure 2:
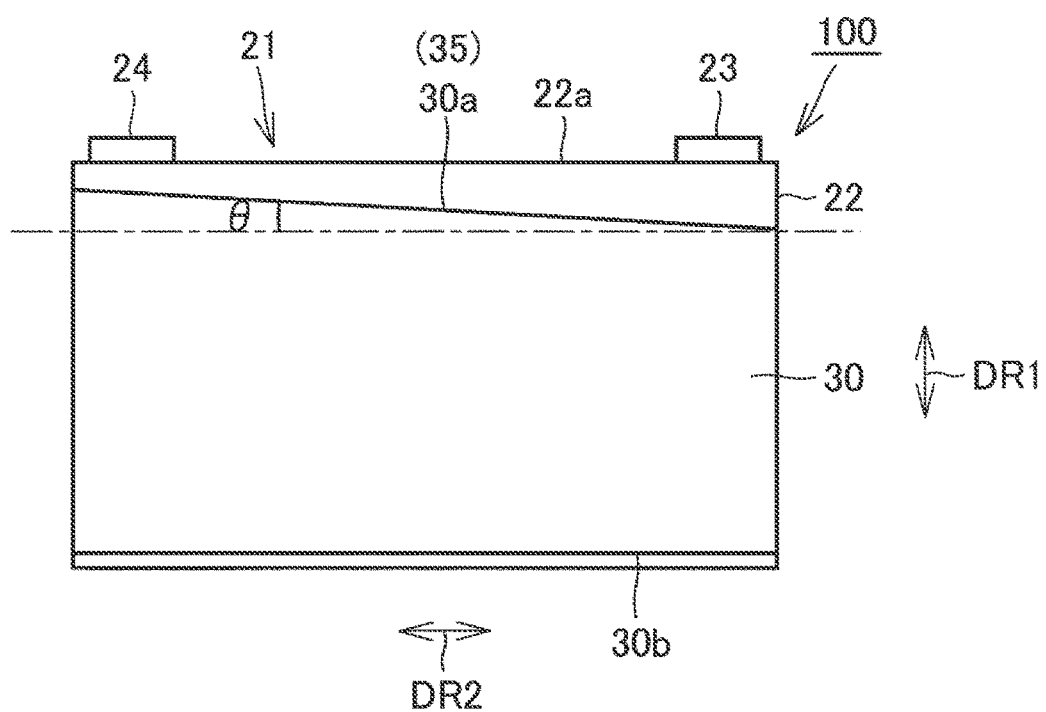
FIG. 2 is a view illustrating a spacer provided in the power storage module according to Embodiment 1 and a power storage cell placed behind the spacer when the spacer and the power storage module are viewed from the front side.

FIG. 2 is a view illustrating the spacer provided in the power storage module according to Embodiment 1 and the power storage cell placed behind the spacer when the spacer and the power storage cell are viewed from the front side.

As illustrated in FIGS. 1, 2, the spacer 30 has a plate shape. A discharge portion 35 via which liquid reaching the spacer 30 from above is discharged to outside the spacer is provided in the spacer 30.

The spacer 30 includes a top face portion 30a and a bottom face portion 30b. The top face portion 30a is placed on an upper end side of the spacer 30 in the up-down direction (a DR1 direction in FIG. 2). The top face portion 30a is placed at a position below the top face 22a of the housing 22 of the power storage cell 21. The contact angle between the top face portion 30a and water is around 80 degrees, for example. The bottom face portion 30b is placed on a lower end side of the spacer 30 in the up-down direction.

In Embodiment 1, the top face portion 30a has an inclined surface inclined downward as it is directed from a first side toward a second side in the width direction (a DR2 direction in FIG. 2) perpendicular to the arrangement direction and the up-down direction. The inclined surface constitutes the discharge portion 35. An inclination angle θ of the inclined surface intersecting with the width direction is preferably one degree or more. When the inclination angle θ is set to one degree or more, liquid can be more surely moved along the inclined surface.

The power storage module 100 is accommodated inside a housing case (not illustrated), but when the housing case is cooled off, dew drop water may be caused. Further, liquid may enter the housing case. In such a case, liquid may reach the spacer 30 from above the spacer 30.

In a case where liquid reaches the spacer 30 from above the spacer 30, the liquid can be discharged to outside the spacer 30 via the discharge portion 35. More specifically, when liquid flows along the inclined surface of the top face portion 30a, the liquid is discharged to outside the spacer 30. Hereby, it is possible to restrain a creepage distance between the external terminals of the power storage cells 21 adjacent to each other from decreasing due to accumulation of liquid. As a result, it is possible to secure an insulating property between the external terminals of the power storage cells 21 adjacent to each other, thereby making it possible to restrain a short circuit from being caused between the power storage cells 21 adjacent to each other.

Note that the creepage distance between the external terminals of the power storage cells 21 adjacent to each other will be described later with reference to FIGS. 4, 5.

Comparative Example

Figure 3:
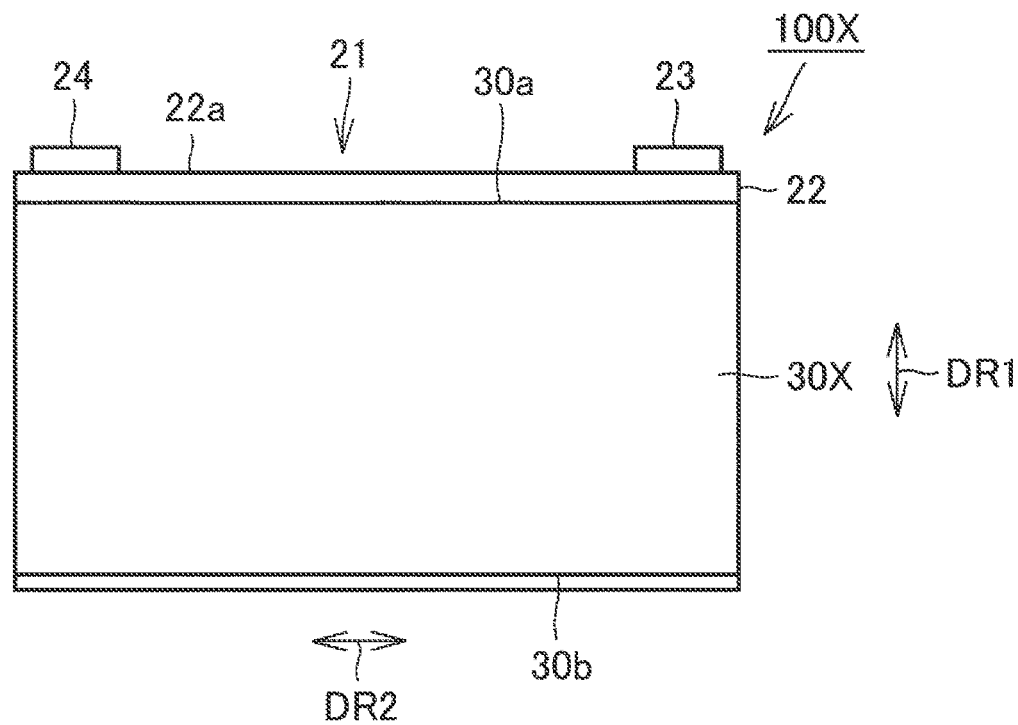
FIG. 3 is a view illustrating a spacer provided in a power storage module according to a comparative example and a power storage cell placed behind the spacer when the spacer and the power storage module are viewed from the front side.

FIG. 3 is a view illustrating a spacer provided in a power storage module according to a comparative example and a power storage cell placed behind the spacer when the spacer and the power storage cell are viewed from the front side. With reference to FIG. 3, a power storage module 100X according to the comparative example will be described.

As illustrated in FIG. 3, the power storage module 100X according to the comparative example is different from the power storage module 100 according to Embodiment 1 in terms of the shape of a spacer 30X. Other configurations of the power storage module 100X are generally similar to those in Embodiment 1. In the spacer 30X, the top face portion 30a is formed in a flat shape.

Figure 4:
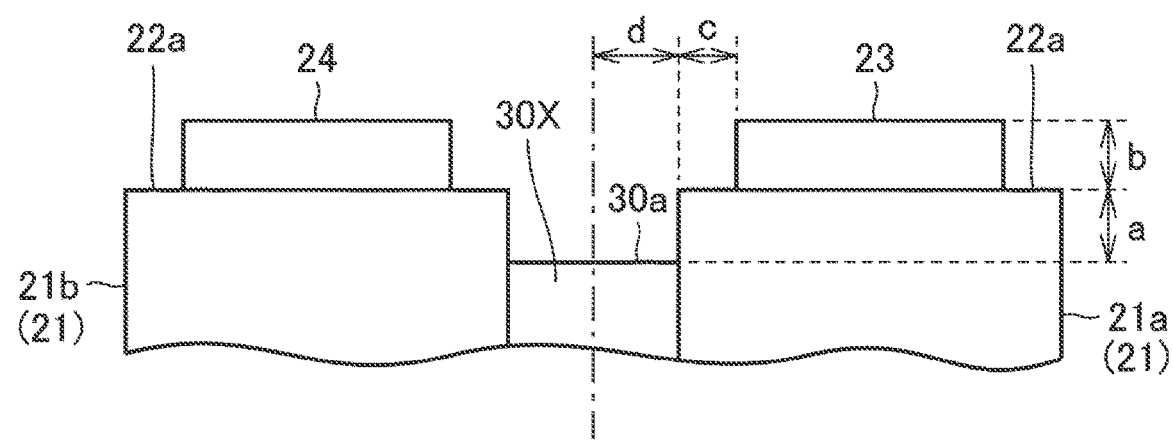
FIG. 4 is a view to describe a creepage distance between external terminals adjacent to each other in the power storage module according to the comparative example.

FIG. 4 is a view to describe a creepage distance between external terminals adjacent to each other in the power storage module according to the comparative example.

The length from the positive terminal 23 to the top face 22a of the housing 22 along the up-down direction is expressed as b (mm), the length from the top face 22a of the housing 22 to the top face portion 30a of the spacer 30X along the up-down direction is expressed as a (mm), the distance from a side face of the housing 22 to a side face of the positive terminal 23 along the arrangement direction is expressed as c (mm), and the distance from a central part of the spacer 30X to the side face of the housing 22 along the arrangement direction is expressed as d (mm). In this case, the insulating property between the external terminals of the power storage cells 21 adjacent to each other depends on a creepage distance (a+b+c+d) in the nearest-neighbor part between the external terminals.

Figure 5:
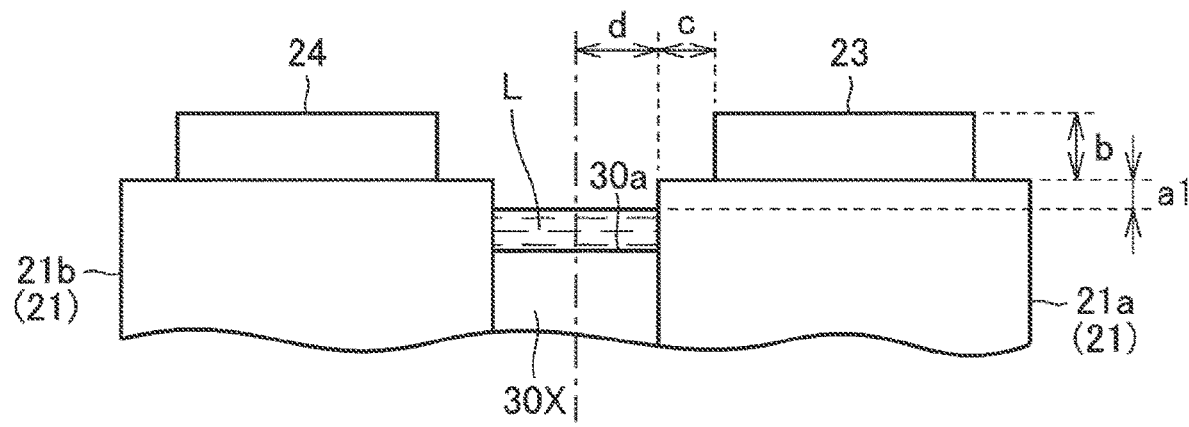
FIG. 5 is a view illustrating a state where liquid is accumulated on the top face of the spacer in the power storage module according to the comparative example.

FIG. 5 is a view illustrating a state where liquid is accumulated on the top face of the spacer in the power storage module according to the comparative example.

As illustrated in FIG. 5, in the comparative example, the top face portion 30a of the spacer 30X is formed in a flat shape, and therefore, liquid L reaching the spacer 30X from above is accumulated on the top face portion 30a. In such a case, when the length from a liquid surface to the top face 22a of the housing 22 along the up-down direction is expressed as a1 (mm), the creepage distance is expressed as a1+b+c+d.

Here, a1 (mm) is smaller than a (mm) described above, and the creepage distance (a1+b+c+d) in a case where liquid is accumulated on the top face portion 30a is small in comparison with a case where liquid is not accumulated on the top face portion 30a as illustrated in FIG. 4. Hereby, in the power storage module 100X according to the comparative example, the insulating property between the external terminals adjacent to each other decreases due to accumulation of the liquid L on the top face portion 30a of the spacer 30X, so that the power storage cells 21 adjacent to each other each may make a short circuit.

Embodiment 2

Figure 6:
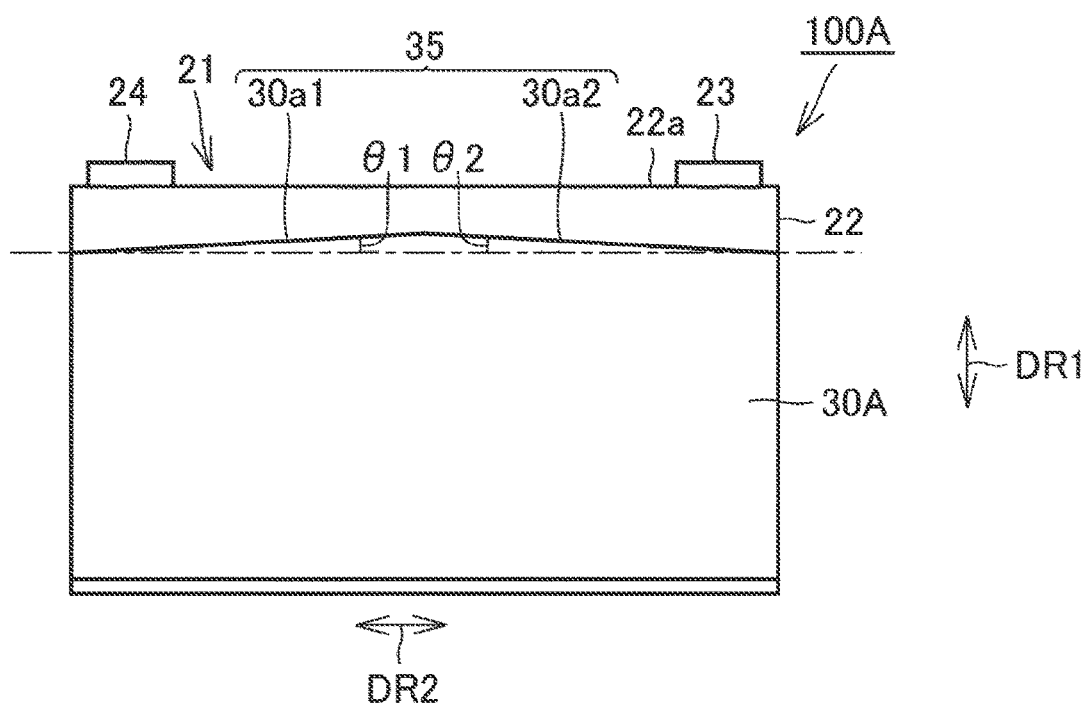
FIG. 6 is a view illustrating a spacer provided in a power storage module according to Embodiment 2 and a power storage cell placed behind the spacer when the spacer and the power storage module are viewed from the front side.

FIG. 6 is a view illustrating a spacer provided in a power storage module according to Embodiment 2 and a power storage cell placed behind the spacer when the spacer and the power storage cell are viewed from the front side. With reference to FIG. 6, a power storage module 100A according to Embodiment 2 will be described.

As illustrated in FIG. 6, the power storage module 100A according to Embodiment 2 is different from the power storage module 100 according to Embodiment 1 in terms of the shape of a spacer 30A. Other configurations of the power storage module 100A are generally similar to those in Embodiment 1.

As illustrated in FIG. 6, the top face portion 30a of the spacer 30A has a first inclined surface 30a1 and a second inclined surface 30a2. In Embodiment 2, the discharge portion 35 is constituted by the first inclined surface 30a1 and the second inclined surface 30a2.

The first inclined surface 30a1 is inclined downward as it is distanced from a central part of the spacer 30A in the width direction toward the first side in the width direction. An inclination angle θ1 of the first inclined surface 30a1 intersecting with the width direction is preferably one degree or more.

The second inclined surface 30a2 is inclined downward as it is distanced from the central part of the spacer 30A in the width direction toward the second side in the width direction. An inclination angle θ2 of the second inclined surface 30a2 intersecting with the width direction is preferably one degree or more.

When the inclination angles θ1, θ2 are set to one degree or more, liquid can be more surely moved along the inclined surfaces.

Even in a case of the above configuration, the power storage module 100A according to Embodiment 2 yields an effect generally similar to that of the power storage module 100 according to Embodiment 1.

Embodiment 3

Figure 7:
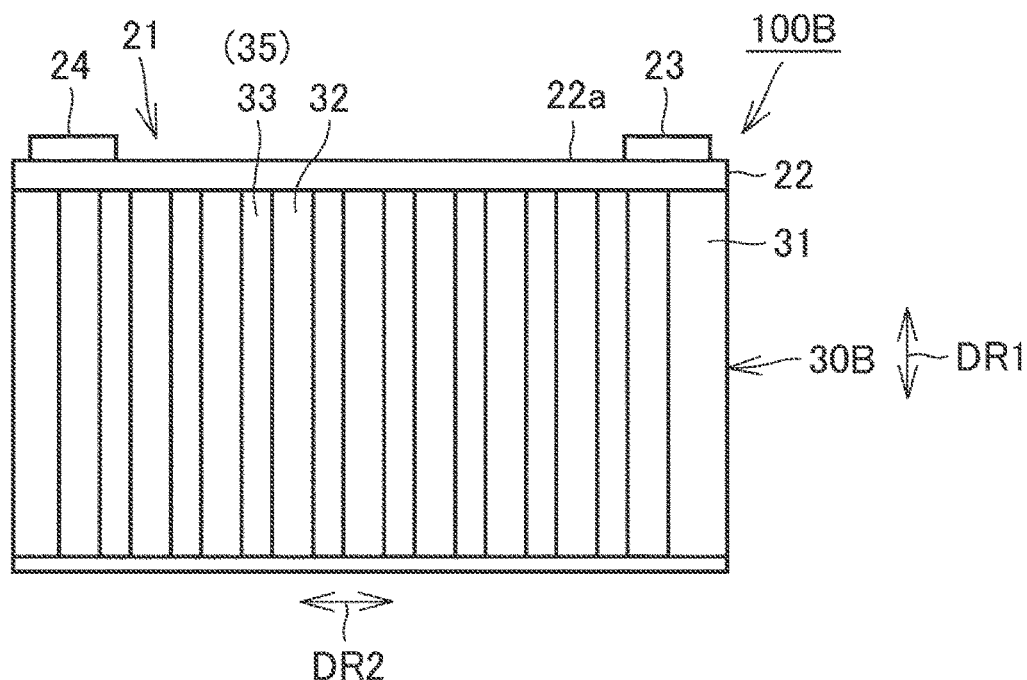
FIG. 7 is a view illustrating a spacer provided in a power storage module according to Embodiment 3 and a power storage cell placed behind the spacer when the spacer and the power storage module are viewed from the front side.
Figure 8:
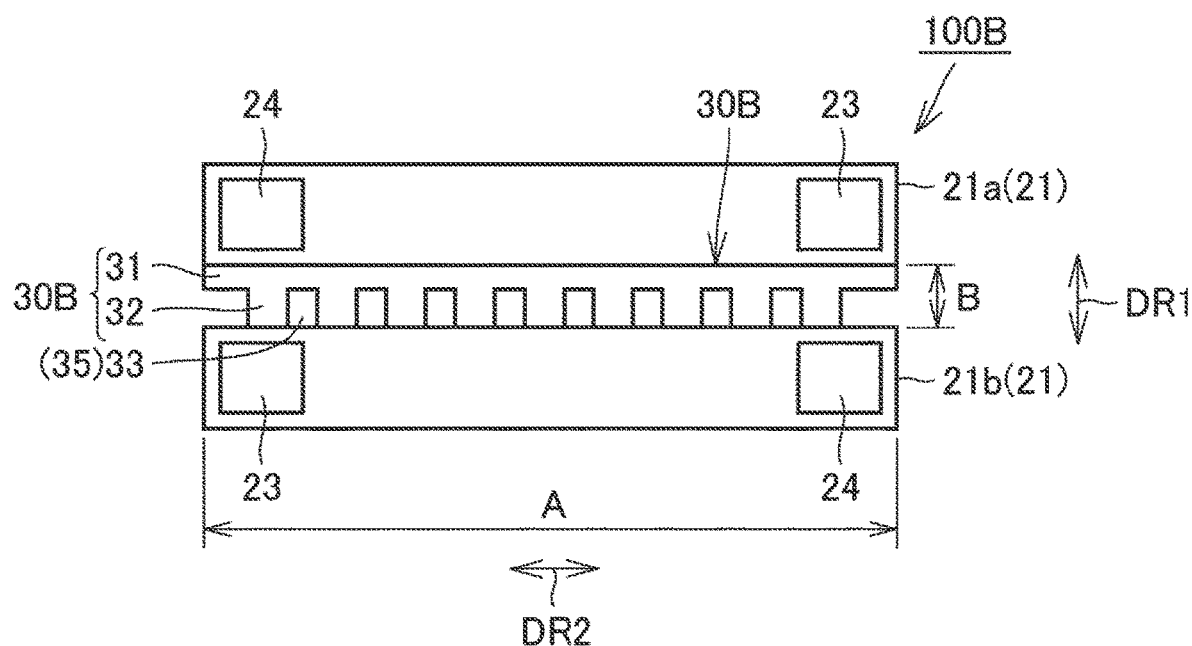
FIG. 8 is a top view partially illustrating the power storage module according to Embodiment 3.

FIG. 7 is a view illustrating a spacer provided in a power storage module according to Embodiment 3 and a power storage cell placed behind the spacer when the spacer and the power storage cell are viewed from the front side. FIG. 8 is a top view partially illustrating the power storage module according to Embodiment 3. With reference to FIGS. 7, 8, a power storage module 100B according to Embodiment 3 will be described.

As illustrated in FIGS. 7, 8, the power storage module 100B according to Embodiment 3 is different from the power storage module 100 according to Embodiment 1 in terms of the shape of a spacer 30B. Other configurations of the power storage module 100B are generally similar to those in Embodiment 1.

The spacer 30B includes a flat portion 31 and a plurality of projecting portions 32. The flat portion 31 is generally parallel to the up-down direction and the width direction. The top face of the flat portion 31 is generally parallel to the width direction. The flat portion 31 abuts with the housing 22 of a power storage cell (the first power storage cell 21a) as one of the power storage cells 21 adjacent to each other. When the flat portion 31 is viewed from its front side (from the arrangement direction), the flat portion 31 has a generally rectangular shape.

The projecting portions 32 project from the flat portion 31 toward a power storage cell (the second power storage cell 21b) as the other one of the power storage cells 21 adjacent to each other. The projecting portions 32 are provided to extend in the up-down direction and are placed at intervals in the width direction. The projecting portions 32 each have a pole shape having a top face and a bottom face at both ends in the up-down direction. More specifically, the projecting portions 32 each have a square-pole shape. Respective end parts of the projecting portions 32 in the arrangement direction abut with the housing 22 of the second power storage cell 21b.

When the projecting portions 32 are formed as such, a plurality of discharge channels 33 communicating in the up-down direction is formed in the spacer 30B. In the present embodiment, the discharge portion 35 is constituted by one or more discharge channels 33.

In this case, when the length of the housing 22 in the width direction is expressed as A (mm), the distance between the housings 22 adjacent to each other in the arrangement direction is expressed as B (mm), and the total passage area of the discharge channels 33 on a section of the spacer 30B that is perpendicular to the up-down direction is expressed as C ($mm^2$), it is preferable that C/(A×B) be not less than 1% but not more than 50%.

In a case where liquid reaches the spacer 30B from above the spacer 30B, the liquid can be discharged downward from the spacer 30B via the discharge channels 33. Further, in a case where C/(A×B) is set to be not less than 1% but not more than 50%, when an impact is input into the spacer 30B from outside, it is possible to restrain the spacer from being damaged.

Thus, with the power storage module 100B according to Embodiment 3, it is possible to obtain an effect generally similar to that of the power storage module 100 according to Embodiment 1.

Note that Embodiment 3 described above deals with an example in which the discharge channels 33 are provided in the spacer 30B. However, the present disclosure is not limited to this, and one or more discharge channels 33 should be provided, provided that liquid can be discharged.

Embodiment 4

Figure 9:
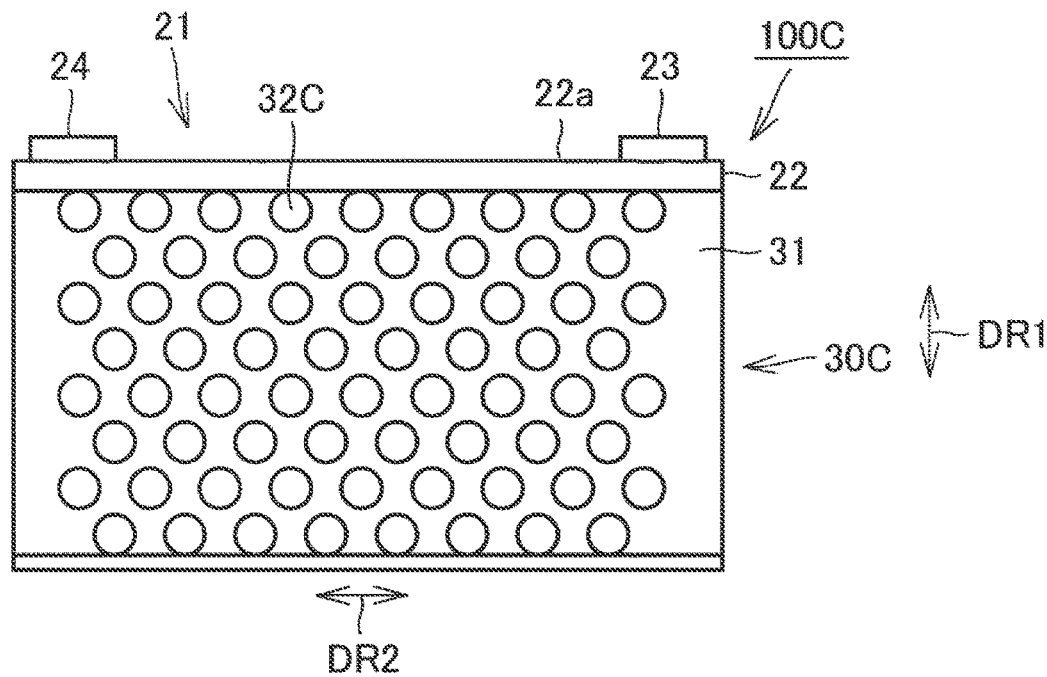
FIG. 9 is a view illustrating a spacer provided in a power storage module according to Embodiment 4 and a power storage cell placed behind the spacer when the spacer and the power storage module are viewed from the front side.
Figure 10:
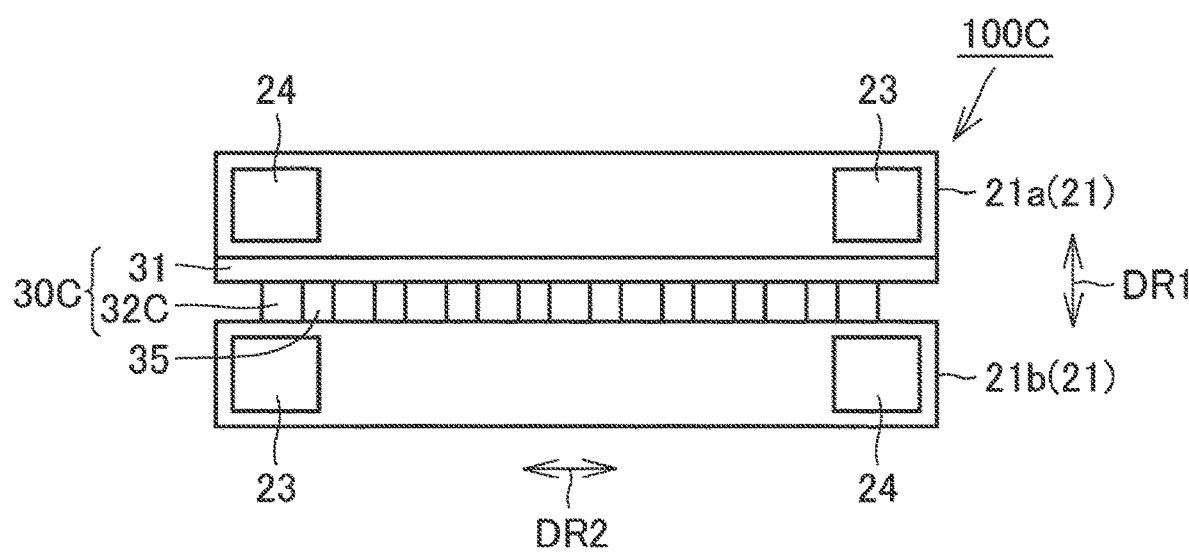
FIG. 10 is a top view partially illustrating the power storage module according to Embodiment 4.

FIG. 9 is a view illustrating a spacer provided in a power storage module according to Embodiment 4 and a power storage cell placed behind the spacer when the spacer and the power storage cell are viewed from the front side. FIG. 10 is a top view partially illustrating the power storage module according to Embodiment 4. With reference to FIGS. 9, 10, a power storage module 100C according to Embodiment 4 will be described.

As illustrated in FIGS. 9, 10, the power storage module 100C according to Embodiment 4 is different from the power storage module 100B according to Embodiment 3 in terms of the shape of a spacer 30C. Other configurations of the power storage module 100C are generally similar to those in Embodiment 3.

The spacer 30C includes a plurality of projecting portions 32C having a shape different from that of the projecting portions 32 of the spacer 30B according to Embodiment 2. The projecting portions 32C each have a pillar shape having a top face portion and a bottom face portion at both ends in the arrangement direction. More specifically, the projecting portions 32C each have a circular column shape.

The projecting portions 32C are placed at intervals in a zigzag manner.

When the projecting portions 32C are formed as such, a plurality of discharge channels communicating in the up-down direction is formed in the spacer 30C. The discharge portion 35 is constituted by the discharge channels.

Even in the present embodiment, when the length of the housing 22 in the width direction is expressed as A (mm), the distance between the housings 22 adjacent to each other in the arrangement direction is expressed as B (mm), and the total passage area of the discharge channels 33 on a section of the spacer 30C that is perpendicular to the up-down direction is expressed as C ($mm^2$), it is preferable that C/(A×B) be not less than 1% but not more than 50%.

Even in a case of the above configuration, with the power storage module 100C according to Embodiment 4, it is possible to obtain an effect generally similar to that of the power storage module 100B according to Embodiment 3.

Embodiment 5

Figure 11:
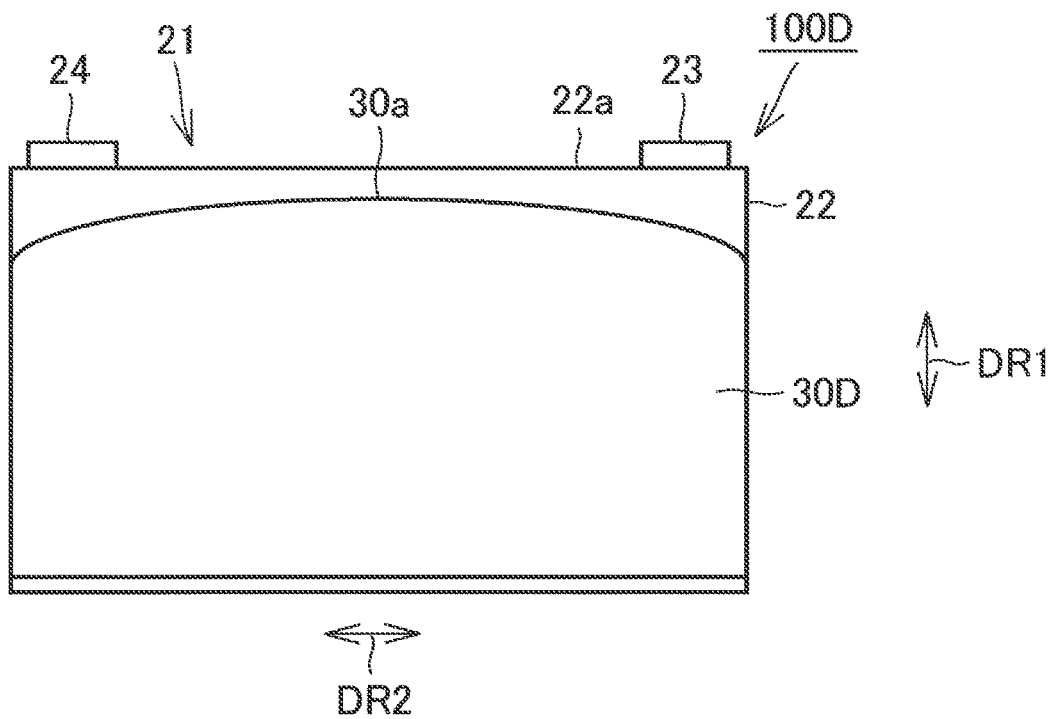
FIG. 11 is a view illustrating a spacer provided in a power storage module according to Embodiment 5 and a power storage cell placed behind the spacer when the spacer and the power storage module are viewed from the front side.

FIG. 11 is a view illustrating a spacer provided in a power storage module according to Embodiment 5 and a power storage cell placed behind the spacer when the spacer and the power storage cell are viewed from the front side. With reference to FIG. 11, a power storage module 100D according to Embodiment 5 will be described.

As illustrated in FIG. 11, the power storage module 100D according to Embodiment 5 is different from the power storage module 100 according to Embodiment 1 in terms of the shape of the top face portion 30a of a spacer 30D. Other configurations of the power storage module 100D are generally similar to those in Embodiment 1.

The top face portion 30a of the spacer 30D has a curved surface formed such that a central part of the curved surface in the width direction projects upward as compared to both ends of the curved surface in the width direction. In this case, the discharge portion 35 is constituted by the curved surface.

Even in a case where the top face portion 30a is formed as the curved surface as such, when liquid flows along the curved surface, the liquid can be discharged to outside the spacer 30D. Note that it is preferable that the curvature radius of the curved surface be equal to or less than R1000, for example. When the curvature radius is set as such, liquid can be moved along the curved surface, so that the liquid can be more surely discharged to outside the spacer 30D.

Even in a case of the above configuration, with the power storage module 100D according to Embodiment 5, it is possible to obtain an effect generally similar to that of the power storage module 100 according to Embodiment 1.

Reference Example

Figure 12:
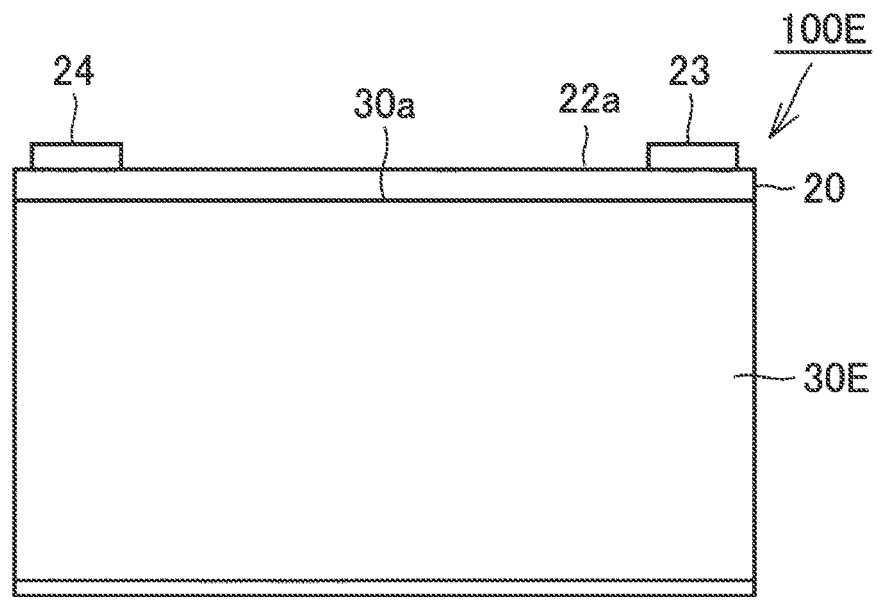
FIG. 12 is a view illustrating a spacer provided in a power storage module according to a reference example and a power storage cell placed behind the spacer when the spacer and the power storage module are viewed from the front side.

FIG. 12 is a view illustrating a spacer provided in a power storage module according to a reference example and a power storage cell placed behind the spacer when the spacer and the power storage cell are viewed from the front side. With reference to FIG. 12, a power storage module 100E according to the reference example will be described.

As illustrated in FIG. 12, the power storage module 100E according to the reference example is different from the power storage module 100X according to the comparative example in that the top face portion 30a of a spacer 30E is subjected to water-repellent treatment. Due to the water-repellent treatment, the contact angle between the top face portion 30a and water is generally 150 degrees or more.

Even in this case, due to the water-repellent treatment, liquid reaching the spacer 30E from above can be discharged to outside the spacer 30.

It should be considered that the embodiments described herein are just examples in all respects and are not limitative. The scope of the disclosure is shown by Claims and is intended to include all modifications made within the meaning and scope equivalent to Claims.

What is claimed is:

1. A power storage module comprising:
a first power storage cell and a second power storage cell placed adjacent to each other, the first power storage cell and the second power storage cell each including a housing having a top face and external terminals provided on the top face; and
a spacer having an insulating property and placed between the housings adjacent to each other, wherein the spacer includes a first inclined surface and a second inclined surface on a top surface of the spacer, the first inclined surface being inclined downward from a central part of the spacer to a first side part of the spacer and the second inclined surface being inclined downward from the central part of the spacer to a second side part of the spacer.

2. The power storage module according to claim 1, wherein:
the first inclined surface and the second inclined surface are curved surfaces.

* * * * *